United States Patent [19]

Schröder

[11] Patent Number: 4,487,447
[45] Date of Patent: Dec. 11, 1984

[54] CONVERTIBLE TOP FOR PASSENGER MOTOR VEHICLES

[75] Inventor: Gerhard Schröder, Ditzingen, Fed. Rep. of Germany

[73] Assignee: Dr. Ing. h.c.F. Porsche AG, Fed. Rep. of Germany

[21] Appl. No.: 397,033

[22] Filed: Jul. 12, 1982

[30] Foreign Application Priority Data

Jul. 11, 1981 [DE] Fed. Rep. of Germany ....... 3127524

[51] Int. Cl.³ ................................................ B60J 7/12
[52] U.S. Cl. .................................... 296/108; 296/111
[58] Field of Search ......................... 296/107, 108, 111

[56] References Cited

U.S. PATENT DOCUMENTS

| 1,772,779 | 8/1930 | Waise | 296/108 |
| 1,952,252 | 3/1934 | Heuser | 296/107 |
| 2,019,614 | 11/1935 | Marshall | 296/107 |
| 2,040,680 | 5/1936 | Westrope | 296/107 |
| 2,076,243 | 4/1937 | Marshall et al. | 296/107 |

FOREIGN PATENT DOCUMENTS

| 530770 | 9/1956 | Canada | 296/107 |
| 527071 | 5/1955 | Italy | 296/107 |

Primary Examiner—Robert B. Reeves
Assistant Examiner—Russell D. Stormer
Attorney, Agent, or Firm—Craig & Burns

[57] ABSTRACT

A convertible top for a passenger motor vehicle, with the convertible top including a top covering, longitudinally extending side members, and a main bow. The main bow is coupled to the body portion of the motor vehicle and is connected by an articulated lever system to the longitudinally extending side members, with the top covering, in an area behind the main bow resting on at least one reinforcement bow. To reduce the number of components and prevent the generation of wind noises, the reinforcement bow is spaced from but attached to the main bow and a rigid form-unit is interposed between the main bow and reinforcement bow, with the top covering resting on the rigid-form unit.

9 Claims, 5 Drawing Figures

CONVERTIBLE TOP FOR PASSENGER MOTOR VEHICLES

The present invention relates to a top construction and, more particularly, to a convertible top for passenger motor vehicles, with the top including a top covering, longitudial side members, and a main bow coupled to a body of the motor vehicle and connected to longitudinal members by a system of articulated levers, while the covering of the top in an area behind the main bow rests on at least one support bow.

In, for example, German Pat. No. 685,137, a convertible top construction is proposed wherein the main bow is coupled to the body of the motor vehicle and connected to longitudinal side members or to the body with parallelogram-type articulated levers. A reinforcement bow located behind the main bow in this proposed construction is coupled to the body of the motor vehicle independently of the main bow.

A disadvantage of the above proposed construction resides in the fact that it is necessary to employ a large number of components to couple the main and reinforcement bows. Additionally, the top covering rests on the cross bows only at a limited number of points thereby resulting in the generation of wind noises by the top covering during a traveling of the motor vehicle.

The aim underlying the present invention essentially resides in providing a convertible top construction which minimizes the number of components required while nevertheless precluding the generation of wind noises.

In accordance with advantageous features of the present invention, a convertible or folding top for passenger motor vehicles is provided wherein a reinforcement bow is positioned away from the main bow to which it is connected and, between the main bow and reinforcement bow, a rigid form-unit is provided which supports the top covering of the convertible or folding top.

By virtue of the resting or disposing of the top covering on the form units which have a relatively large surface area, it is possible, by virtue of the present invention, to avoid the generation of wind noises.

In accordance with still further features of the present invention, the main bow and reinforcement bow are formed or constructed as a one piece assembly or a single unit thereby saving the overall number of components required for the top so as to ensure an overall simple construction.

The main bow may be formed in a conventional manner so as to envelope a passenger compartment of the motor vehicle in the form of an arc; whereas, the reinforcement bow encompasses a section rearwardly of the main bow and is attached to the main bow in proximity of longitudinal members, with the reinforcement bow extending in a direction opposite to that of the normal travel direction of the vehicle and then changing into an arc shaped area encompassing the passenger compartment.

Advantageously, the rigid form-unit, main bow, and reinforcement bow may be constituted by a single structural unit formed by side components and a center portion.

Each side component may, in accordance with the present invention, in a first lower section, include a U-shaped cross section and, in a second upper section, be equipped with a top covering contour corresponding to a form-section.

The side component may be provided with bearing eyes and may be manufactured by, for example, casting and, preferably, an aluminum pressure die casting.

In addition to a form unit between the main bow and reinforcement bow, in accordance with still further features of the present invention, another rigid form-unit, formed by an outer frame component or an extension thereof, is disposed in a front area of the convertible or folding top.

Accordingly, it is an object of the present invention to provide a convertible top for passenger motor vehicles which avoids, by simple means, shortcomings and disadvantages encountered in the prior art.

Another object of the present invention resides in providing a convertible top for passenger motor vehicles which minimizes the number of components while nevertheless providing the necessary rigidity and support for the top.

Yet another object of the present invention resides in providing a convertible top for passenger motor vehicles which minimizes if not avoids the generation of wind noises.

A still further object of the present invention resides in providing a convertible top for passenger motor vehicles which is simple in construction and therefore relatively inexpensive to manufacture.

These and other objects, features, and advantages of the present invention will become more apparent from the following description when taken in connection with the accompanying drawings which show, for the purposes of illustration only, two embodiments in accordance with the present invention, and wherein.

Figure 1:
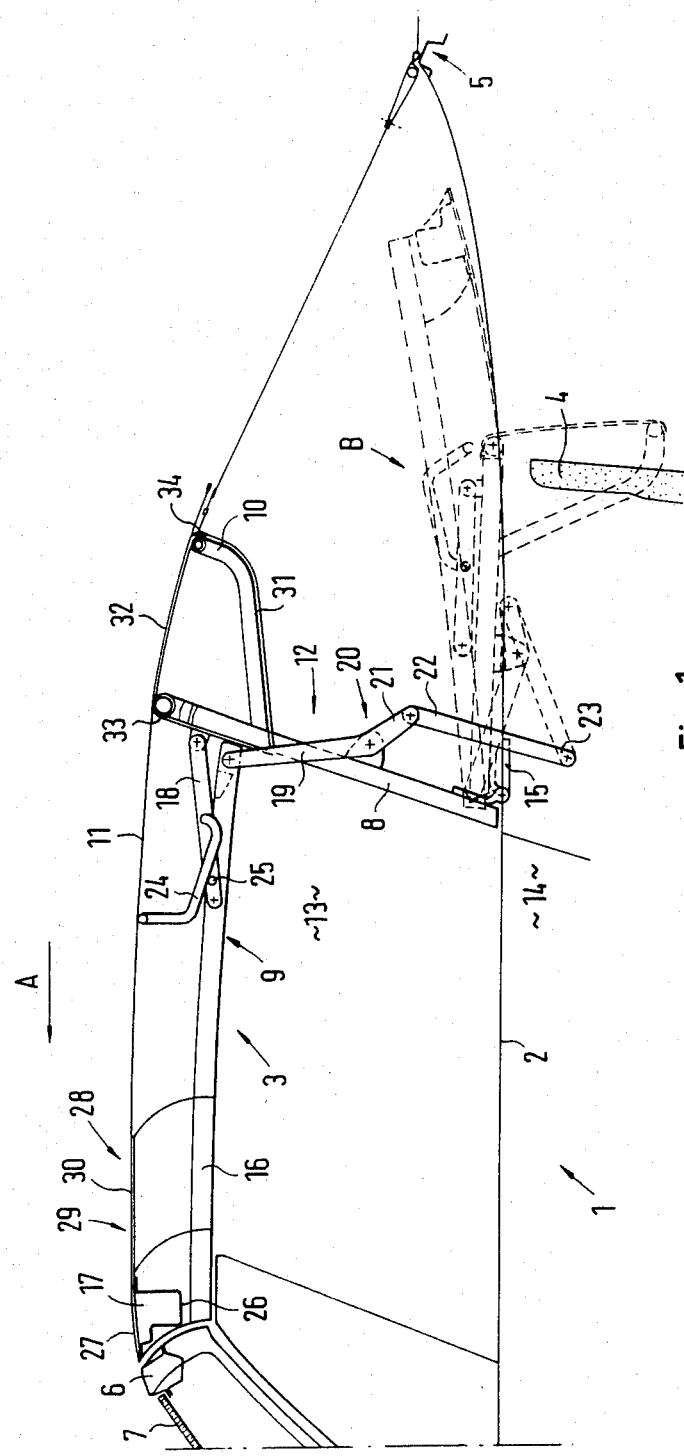
FIG. 1 is a partially schematic side view of a motor vehicle equipped with a convertible top constructed in accordance with the present invention.

Referring now to the drawings wherein like reference numerals are used throughout the various views to designate like parts and, more particularly, to FIG. 1, according to this figure, a passenger motor vehicle generally designated by the reference numeral 1 is equipped with a convertible top generally designated by the reference numeral 3 above a safety belt line 2. The convertible top 3 extends from a transverse wall 5 disposed behind a rear seat assembly 4 to a windshield frame 6 in which is mounted a windshield glass 7. The top 3 is fastened at the windshield frame 6, in a conventional manner, by retaining clamps (not shown) which are adapted to be easily loosened. The convertible top 3 includes a main bow 8, a roof frame generally designated by the reference numeral 9, a reinforcement bow 10, a top covering 11, and a system of articulated levers generally designated by the reference numeral 12. The main bow 8, which archs over a passenger compartment 13, is attached in a conventional manner to a lower part of a body shell 14 of the motor vehicle by hinges 15.

The roof frame 9 includes longitudinally extending side members 16 and a transverse support 17 located near the windshield frame or post 6. The roof frame 9 is hinged to the main bow 8, on the one hand, by a roof frame connecting rod 18 and, on the other hand, by a lever arm 19 of a knee lever generally designated by the reference numeral 20. The other lever arm 21 of the knee-lever 20 cooperates with a guide connecting rod 22, with a free end 23 of the guide connecting rod 22 being coupled to a lower part of the body shell 14 and, as viewed in a direction of travel designated by the arrow A, is disposed behind or to the rear of the main bow 8. The guide connecting rod 22, knee-lever 20, and main bow 8 thus form a parellelogram guide for the convertible top. At approximately a middle section of the roof frame connecting rod 18, an auxiliary pivot or swivel bow 24 is provided, with a height of the bow 24 being adjustable by an eccentric 25. The auxiliary bow 24 is used for stretching the top covering 11.

The support 17 of the roof frame 9 includes an inner frame member 26 and an outer frame member 27 and further includes a form unit generally designated by the reference numeral 29 which is adapted to reinforce a front roof section generally designated by the reference numeral 28. The form unit 29 is formed by an extension 30 of the outer frame member 27. The extension 30 is dimensioned such that when the convertible top is folded, the rigid front section 28 lies behind the rear seat assembly. The provision of the front roof section 28 ensures that the convertible top 3 exhibits good shape stability for the top covering 11 during a traveling of the motor vehicle, particularly due to the pressure conditions existing on the upper side of the top covering 11. The top covering 11 rests on an outer surface of the form unit 29 and is secured thereto by, for example, an adhesive.

The reinforcement bow 10 is separate from but rigidly attached to the main bow 8 and, as viewed in a direction of travel A, is located behind the main bow 8. In the construction of FIG. 1, the main bow 8 and reinforcement bow 10 are fashioned as profile members or components having, for example, a U-shape, tubular, or other similar cross sectional configuration, and are connected to each other by, for example, welding. The reinforcement bow 10 includes slanting side sections 31 which rise in a direction toward the rear of the motor vehicle and are separated or extend from main bow 8 at approximately a height of the longitudinal member 16, with a change from the slanting side sections 31 into a section which arches across the passenger compartment 13. Another form-unit 32 is arranged between the main bow 8 and the upper side of the reinforcement bow 10, with the top cover 11 resting on an upper surface portion of the rigid frame unit 32 and being secured thereto by, for example, an adhesive. Sockets 33, 34 are provided in the form unit 32 and are spaced from each other in a longitudinal direction of the vehicle with the sockets 33 being disposed at a forward end of the unit 32 and sockets 34 disposed at a rear end thereof. The sockets 33 34 are open toward the bottom and surround or encompass the transversely extending sections of the main bow 8 and the reinforcement bow 10, as well as the side area of the reinforcement bow 10 to which the sockets 33, 34 are attached by, for example, welding.

Figure 2:
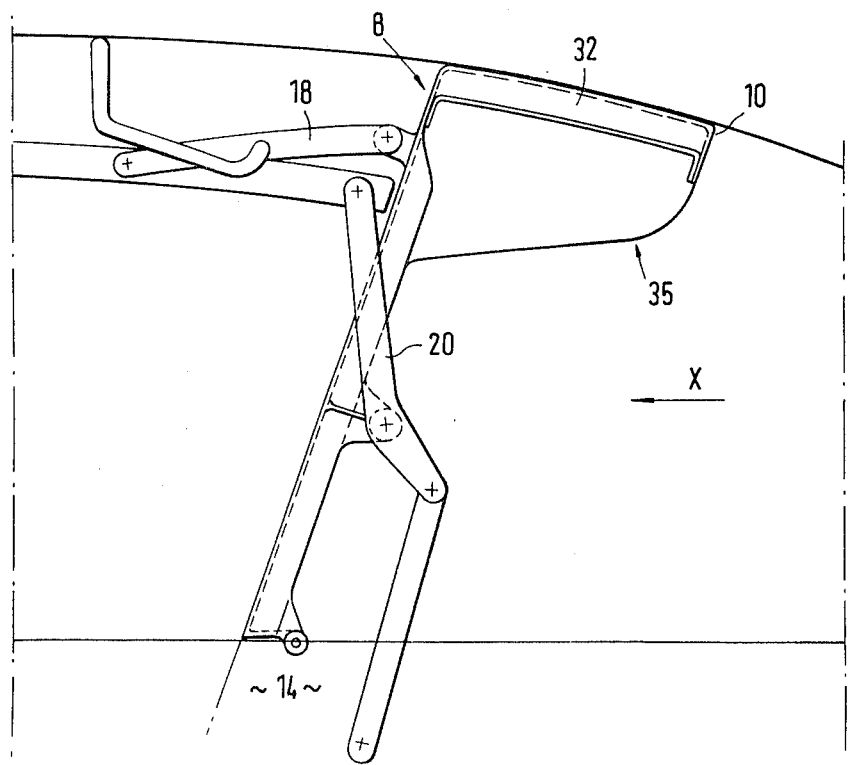
FIG. 2 is a partial side view, on an enlarged scale, of another convertible top constructed in accordance with the present invention.
Figure 3:
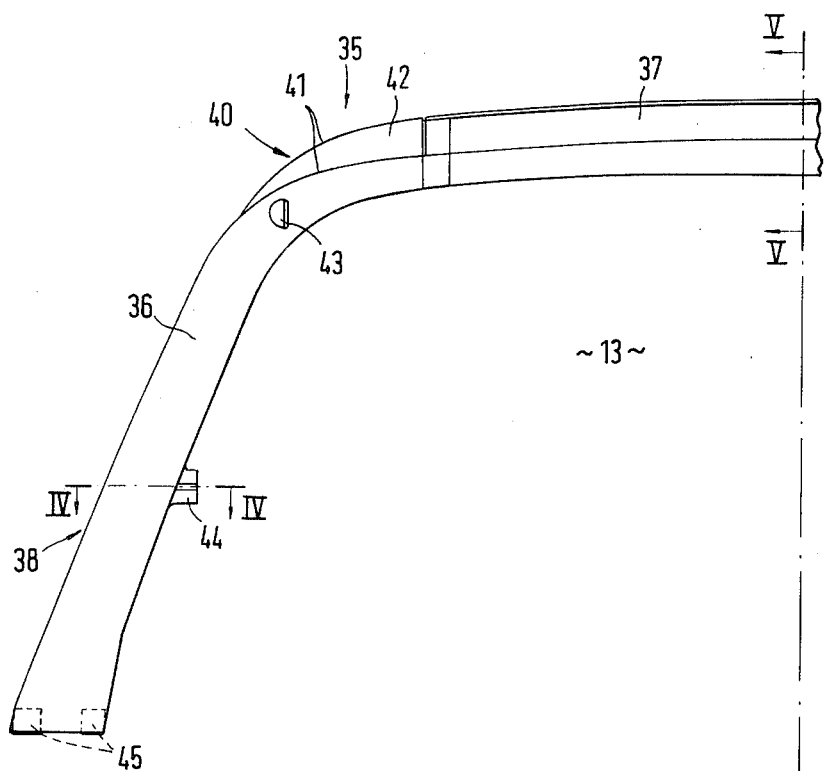
FIG. 3 is a partial view taken in the direction of the arrow X in FIG. 2.
Figure 4:
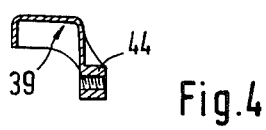
FIG. 4 is a cross sectional view taken along the line IV—IV in FIG. 3.
Figure 5:
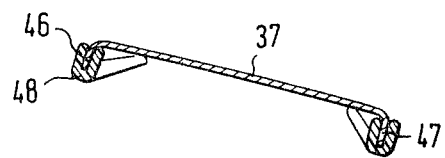
FIG. 5 is a cross sectional view taken along the line V—V in FIG. 3.

As shown in FIGS. 2 and 3, the main bow 8, the reinforcement bow 10 and the form unit 32 may be integrated into a single assembly unit generally designated by the reference numeral 35 which includes side components or members 36 and a central component or member 37 (FIG. 3). The connection of the side components 36 to the central component 37 may be accomplished by, for example, riveting, welding, or similar procedures. Each side component 36 may be manufactured by, for example, casting, and, preferably, by aluminum pressure die casting. Each side component 36 includes a first lower section generally designated by the reference numeral 38 and a second upper section generally designated by the reference numeral 40. The lower section 38, as shown most clearly in FIG. 4, has a generally U-shaped cross section generally designated by the reference numeral 39, with the legs of the U-shape extending generally in a longitudinal direction of the vehicle. The second upper section 40 is provided with a formed section 42 corresponding to a covering contour 41. Additionally, each side component 36 includes bearing eyes 43, 44 for accommodating the roof frame connecting rod 18 and knee lever 20, respectively, as well as a bearing eye 45 for enabling coupling or connecting to the lower part of the body shell 14 of the motor vehicle. The central component 37 has, as shown most clearly in FIG. 5, a generally U-shaped cross sectional configuration with the joints or lips 46, 47 being provided with cover profiles 48.

Since the roof covering 11 is fastened to the front roof section 28 as well as between the main bow 8 and the reinforcement bow 10 to the large surface form units 29, 32, the closed convertible top has good form stability or deformation resistance and wind noises are minimized if not eliminated.

As shown in FIG. 1, when the convertible top 3 is in a folded condition designated B, and illustrated in phantom line, the convertible top 3 is partially recessed in the lower part of the body shell 14. In the folded condition B, the rigid form unit 29 of the front roof section 28 rests on a lower part of the body shell 14 and extends approximately in the same directions as the safety belt line 2, while the rigid form unit 32 located between the main bow 8 and the reinforcement bow 10, assumes an approximately vertical position behind or beside the rear seat assembly 4.

While I have shown and described only two embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A convertible top for a passenger motor vehicle, the convertible top including a top covering, a pair of spaced longitudinally extending side members, a main bow, articulated lever means for connecting the main bow to the side members and a body portion of the motor vehicle, at least one reinforcement bow connected to the main bow and spaced rearwardly therefrom, as viewed in a normal driving direction of the motor vehicle, said main bow and said reinforcement bow being formed as a one piece assembly and a rigid form means interposed between and interconnecting the main bow and reinforcement bow for supporting the top covering.

2. A convertible top according to claim 1, wherein the main bow is of an arcuate shape and envelopes a passenger compartment of the motor vehicle, the reinforcement bow includes a pair of side sections attached to the main bow in proximity to the longitudinally extending side members and extending in a direction opposite to the normal driving direction of the vehicle and an arching section disposed between the first portions and encompassing the passenger compartment.

3. A convertible top according to claim 1, wherein the rigid form means, main bow, and reinforcement bow are formed as a single structural unit including a pair of spaced side components and a center component connecting the side components.

4. A convertible top according to claim 3, wherein each of the side components includes a lower section and an upper section, the lower section having a substantially U-shaped cross sectional configuration, the upper section being provided with a form section corresponding to a predetermined contour of the top covering.

5. A convertible top according to one of claims 3 or 4, wherein bearing eye means are provided in each of the side components for enabling connection of the side components with the body portion of the motor vehicle, the articulated lever means, and a connecting rod means.

6. A convertible top according to claim 5, wherein each side component is an aluminum pressure die cast component.

7. A convertible top according to one of claims 1, 3, or 4, wherein a further rigid form means for supporting the top covering is disposed at a front area of the convertible top, as viewed in a normal driving direction of the motor vehicle.

8. A convertible top according to claim 7, wherein the further rigid form means is formed at least by an outer frame component.

9. A convertible top according to claim 8, wherein the further rigid form means is formed by the outer frame component and an extension portion thereof.

* * * * *